US009536109B2

(12) United States Patent
Ciano et al.

(10) Patent No.: US 9,536,109 B2
(45) Date of Patent: Jan. 3, 2017

(54) METHOD AND SYSTEM FOR ADMINISTERING A SECURE DATA REPOSITORY

(75) Inventors: Giuseppe Ciano, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 12/887,123

(22) Filed: Sep. 21, 2010

(65) Prior Publication Data

US 2011/0093957 A1 Apr. 21, 2011

(30) Foreign Application Priority Data

Oct. 21, 2009 (EP) ..................................... 09173673

(51) Int. Cl.
*G06F 21/64* (2013.01)
(52) U.S. Cl.
CPC ..................... *G06F 21/64* (2013.01)
(58) Field of Classification Search
None
See application file for complete search history.

(56) References Cited

U.S. PATENT DOCUMENTS

| | | | |
|---|---|---|---|
| 5,584,022 A | 12/1996 | Kikuchi et al. | |
| 6,393,126 B1 * | 5/2002 | van der Kaay | G06F 21/725 380/239 |
| 6,898,709 B1 * | 5/2005 | Teppler | 713/178 |
| 6,993,656 B1 * | 1/2006 | Peyravian | H04L 63/123 713/170 |
| 7,058,648 B1 | 6/2006 | Lightfoot et al. | |
| 7,058,968 B2 * | 6/2006 | Rowland et al. | 726/1 |
| 7,240,060 B2 | 7/2007 | Adya et al. | |
| 7,376,681 B1 | 5/2008 | Todd et al. | |
| 2004/0243536 A1 * | 12/2004 | Jensen et al. | 707/1 |
| 2005/0081033 A1 * | 4/2005 | Viot | H04L 9/3247 713/170 |
| 2006/0075245 A1 * | 4/2006 | Meier | 713/176 |
| 2007/0266062 A1 * | 11/2007 | Young | 707/204 |

FOREIGN PATENT DOCUMENTS

TW 200507569 A 2/2005

* cited by examiner

*Primary Examiner* — Lisa Lewis
*Assistant Examiner* — Henry Tsang
(74) *Attorney, Agent, or Firm* — Winstead, P.C.

(57) ABSTRACT

A method, system and computer program product for administering a secure data repository. Rather than using a specific database, an application may use an existing hierarchical file structure, such as provided by conventional operating systems, to store structured data in a number of files. To detect unauthorized, malicious or inadvertent changes to these files, either within one or more files, or by deletion, replacement or movement of files in their entirety, each file incorporates a last change timestamp and the contents of the file are digitally signed. Furthermore, every file in the secure repository is logged in an index file together with its respective change date stamp, and the index file as a whole is also digitally signed. Unauthorized changes can be identified by comparison of the file date stamps with the content of the index as well as verifying the validity of each digital signature.

15 Claims, 7 Drawing Sheets

METHOD AND SYSTEM FOR ADMINISTERING A SECURE DATA REPOSITORY

CROSS-REFERENCE TO RELATED APPLICATIONS

This application claims priority under 35 U.S.C. §119(a) from European Patent Application No. 09173673.6, filed on Oct. 21, 2009, the contents of which are incorporated herein by reference.

TECHNICAL FIELD

The present invention relates to a method and system for administering a secure data repository, for example where a conventional hierarchical file structure is used for the storage of structured data rather than a dedicated database.

BACKGROUND

A common method for applications to store information is by means of an external or embedded relational database ("DB"). Even if in most of the cases this is the best approach, there are some circumstances where it does not offer a real benefit, like for example:

1. The application does not need a relational DB but a hierarchical repository where the information is saved in different layers of the hierarchy. This may be because the information is identified by different IDs, that can be the element of the hierarchy, and the retrieved information performs different levels of navigation of the hierarchy.
2. The application requires a minimum footprint (also for the external application it uses).
3. The application does not need to share information with other applications.

A simple way to implement this kind of repository is to exploit the hierarchical file system available in every operating system, having a specific subtree dedicated for information storage.

Tivoli Common Reporting (TCR) is an example of a component that exploits this functionality.

The Tivoli Common Reporting data store contains the available reports, which you can search, format, and view using a web user interface. The data store organizes reports into groups called report sets, and it also contains related objects such as report designs and report snapshots.

FIG. 1 shows an example of the resulting hierarchical file structure. FIG. 1 shows an exemplary hierarchical file structure in a schematic manner similar to that commonly adopted in graphical user interfaces. As shown, the hierarchy comprises 5 levels, with the root directory 110 on the left hand side. The root directory 110 contains two sub directories 121, 122. Sub directory 121 contains sub directory 131 which in turn contains data file 141. Sub directory 122 itself contains two sub directories 132, 133. Sub directory 132 contains sub directory 142 which in turn contains data file 152. Sub directory 133 in turn contains sub directory 143 which itself contains data file 153. In the case of the present example whereby the data files 141, 152, 153 belong to the Tivoli Common Reporting component, they may comprise report designs, in files with extension .rptdesign, in the hierarchical file system where the directories are the report set and the files are the reports (.rptdesign files). For the sake of the present description, there is defined a repository comprising a subtree branching from the directory 122. Each element of the subtree has an identifier. The directories 122, 132, 133, 142, 143 have the identifiers id1, id2, id5, id3 and id6, respectively. The data files 152 and 153 have the identifiers id4 and id7, respectively. Each element in the subtree may be uniquely identified in terms of a tuple containing identifiers of the element in question, the root of the subtree and each intervening element. Thus, the data file 152 may be identified by means of the tuple {id1, id2, id3, id4}. On this basis, it is not necessary that each identifier be globally unique, but need only be unique within its own directory.

The tree structure may also be considered in terms of levels 0 to n, where 0 is the root directory, 1 is the first level of the repository containing the directory 122, level 2 is the level of directories 132 and 133, . . . , level n−1 is second lowest level in the hierarchy, which in the present example is the level containing directories 142 and 143 and n is the last level, which in the present example is the level containing data files 152 and 153 such that binary information will be saved as leaves of the tree.

A problem arising in this approach is that a malicious or clumsy user could easily change or replace the content of the files or move or delete files or directories in their entirety, without such changes being noticed, leading to unpredictable or incorrect behavior.

BRIEF SUMMARY

In one embodiment of the present invention, a method for administering a secure data repository comprises determining a time characteristic for each of a plurality of files in a repository, where the time characteristic represents a time at which the file is presumed not to have been tampered with. The method further comprises defining a digital representation for each of the time characteristics. Additionally, the method comprise digitally signing each of the digital representations. In addition, the method comprises encoding each of the digitally signed digital representations to its respective file. Furthermore, the method comprises compiling a digital index listing, where the digital index listing comprises an identifier identifying each of the plurality of files. The method further comprises associating each identifier with its respective digital representation of its associated time characteristic. In addition, the method comprises digitally signing the digital index listing.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

Embodiments of the present invention will now be described by way of example with reference to the accompanying drawings in which like references denote similar elements, and in which.

DETAILED DESCRIPTION

As described above, a problem arising from the use of a simple hierarchical file structure for the storing of structured application data is that a malicious or clumsy user could easily change or replace the content of the files or move or delete files or directories in their entirety, without such changes being noticed, leading to unpredictable or incorrect behavior.

Figure 1:
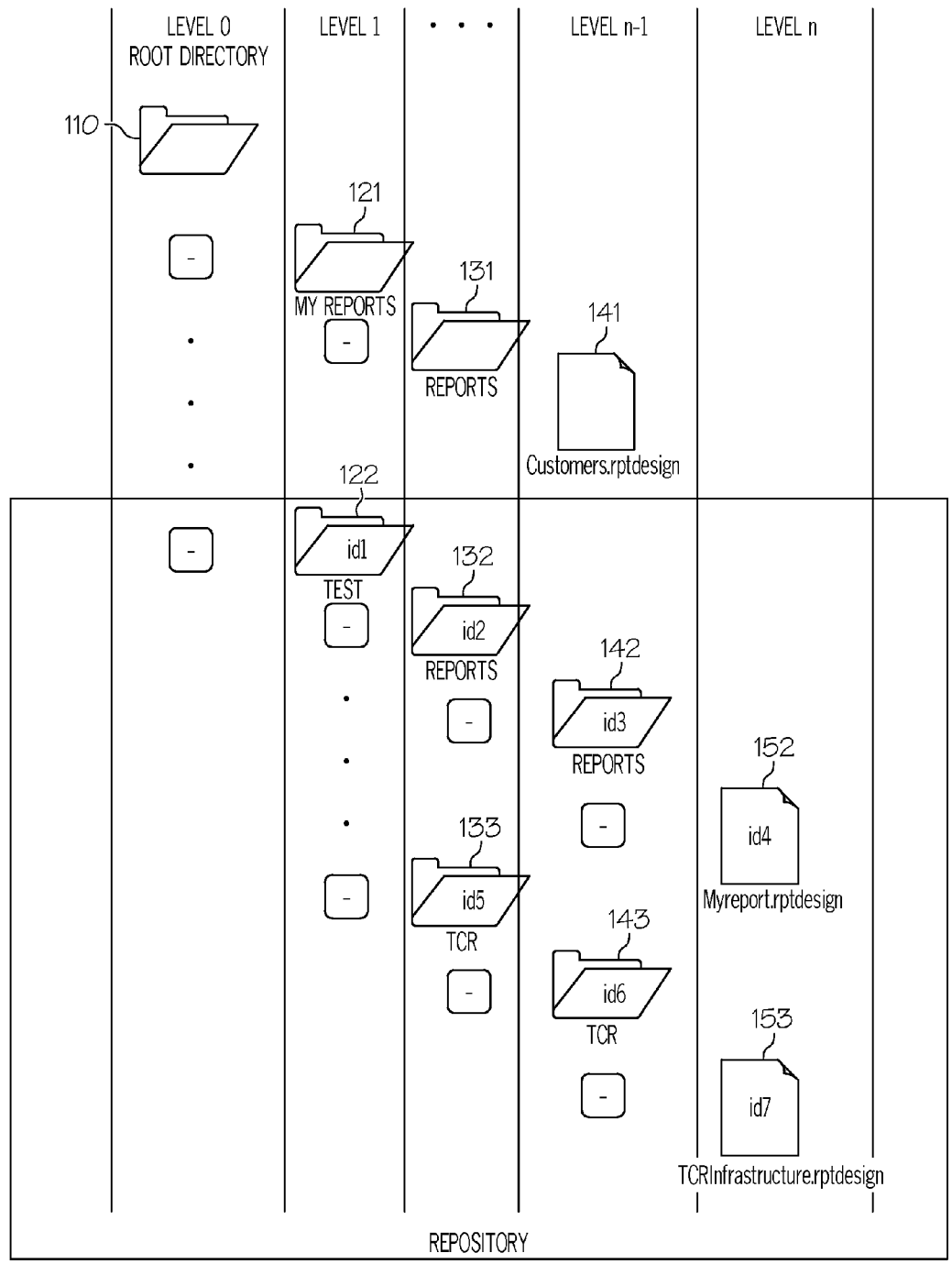
FIG. 1 shows an exemplary hierarchical file structure in a schematic manner similar to that commonly adopted in graphical user interfaces.

It is proposed to augment the basic operating system ("OS") based hierarchical file system as described with reference to FIG. 1 in order to arrange the information using different levels of directory, where each directory is an ID, and the binary content is saved as a leaf in a file.

Figure 2:
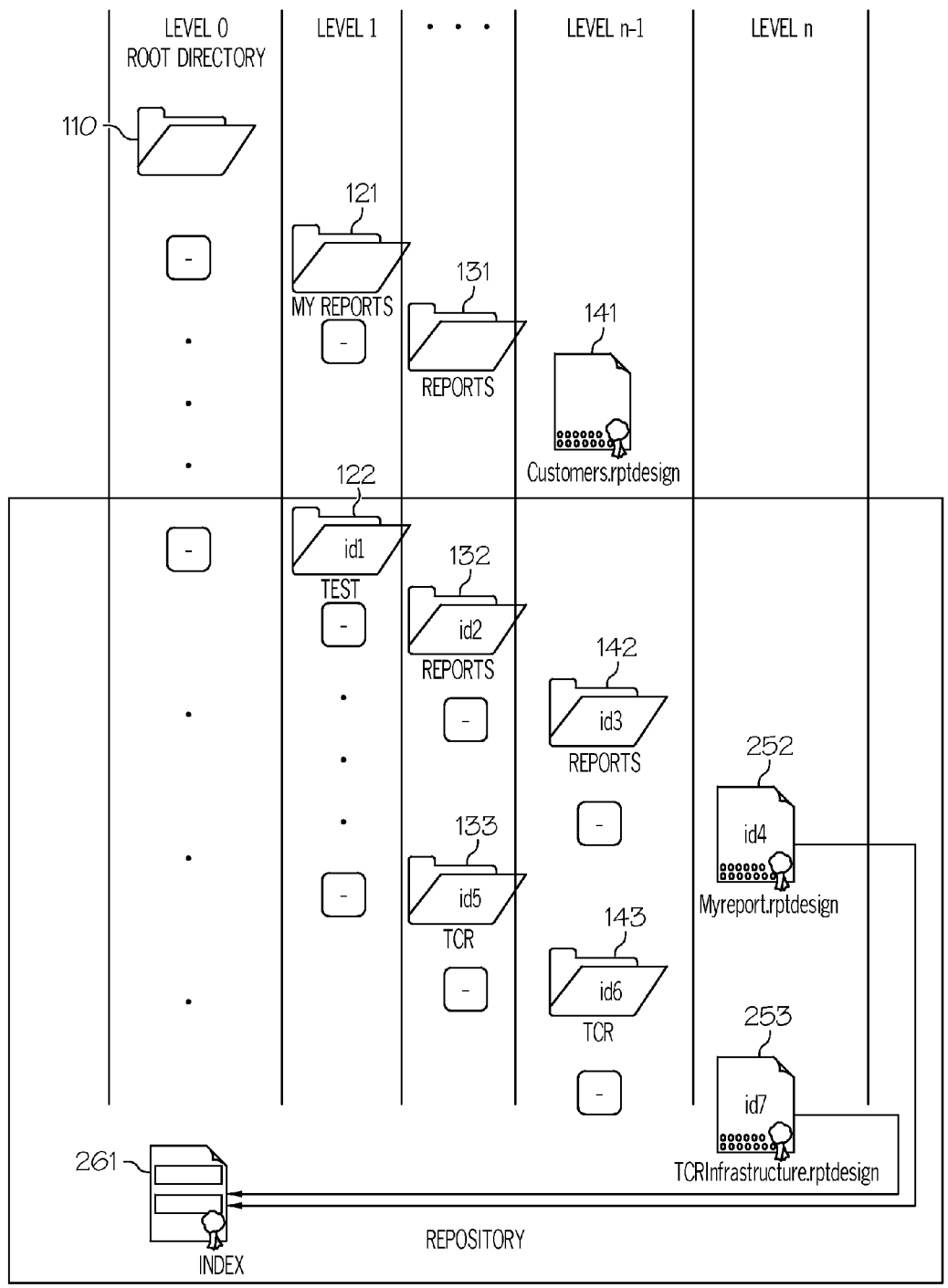
FIG. 2 shows a hierarchical file structure in a schematic manner similar to that commonly adopted in graphical user interfaces in accordance with a first embodiment of the present invention.

FIG. 2 shows a hierarchical file structure in a schematic manner similar to that commonly adopted in graphical user interfaces in accordance with a first embodiment. Referring to FIG. 2, the hierarchical file structure shown is identical to that of FIG. 1, subject to the improvements described hereafter. In particular, the repository further comprises an index file 261 which contains information shared with the binary files that will be used to guarantee data integrity.

As a preliminary measure, each data file is digitally signed, so that it may be readily determined whether the contents of that file have been modified in an unauthorized manner. It is of course an option to encrypt the file; however, this brings a substantial processing overhead when it comes to the use of the file, and as is made clear hereafter, is not necessary in implementing the principles of the present invention. Data files 252 and 253 of FIG. 2 correspond to data files 152 and 153 of FIG. 1, but have furthermore been digitally signed. It will nevertheless be appreciated that digitally signing the data file cannot render detectable the movement, renaming and replacement with another validly signed file or outright deletion of the file.

Accordingly, there is provided a further data file 261 referred to hereafter as the index file or digital index listing. Digital index listing 261 contains an identifier of every file in the repository, and associated with each identifier, the respective digital representation of its respective associated time characteristic representing a time at which the file is presumed not to have been tampered with. This digital index listing 261 is itself digitally signed.

Figure 3:
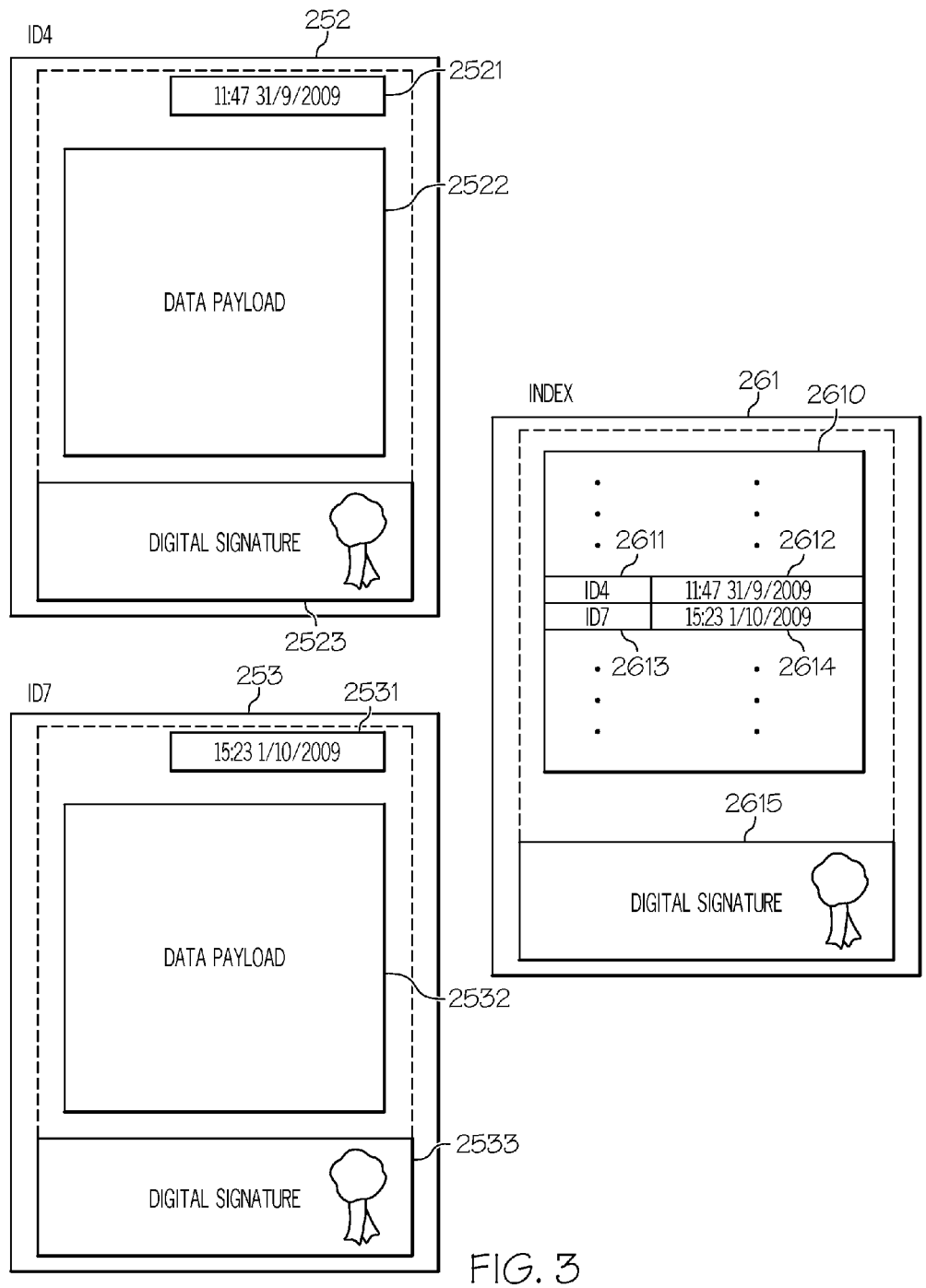
FIG. 3 shows schematically the structure of the files of FIG. 2 in accordance with an embodiment of the present invention.

FIG. 3 shows schematically the structure of the files of FIG. 2. Referring to FIG. 3, the data files 252 and 253 comprise in addition to their data payloads 2522, 2532, a time stamp 2521, 2531 indicating the date at which the file was last modified, and a digital signature 2523, 2533 signing the data payload and timestamp as indicated by the dotted line. The digital index listing 261 meanwhile comprises a list 2610 comprising an identifier of every file in the repository 2611, 2613, and associated with each identifier, the digital representation of its respective associated time characteristic 2612, 2614, representing a time at which the respective file was last modified. It will be understood that while references are provided for two identifiers and two corresponding time characteristics, the list may comprise any number of identifiers and corresponding time characteristics. The digital index listing 261 further comprises a digital signature 2615 signing the list 2610 as indicated by the dotted line.

Optionally, the digital index listing 261 may further comprise a status indicator for each data file, indicating a status such as "stopped," "running," etc.

Optionally, the digital index listing 261 may further incorporate an indication of the last date upon which the digital index listing 261 itself was changed.

Optionally, each data file may further incorporate an indication of the last date upon which the digital index listing 261 itself was changed.

Figure 4:
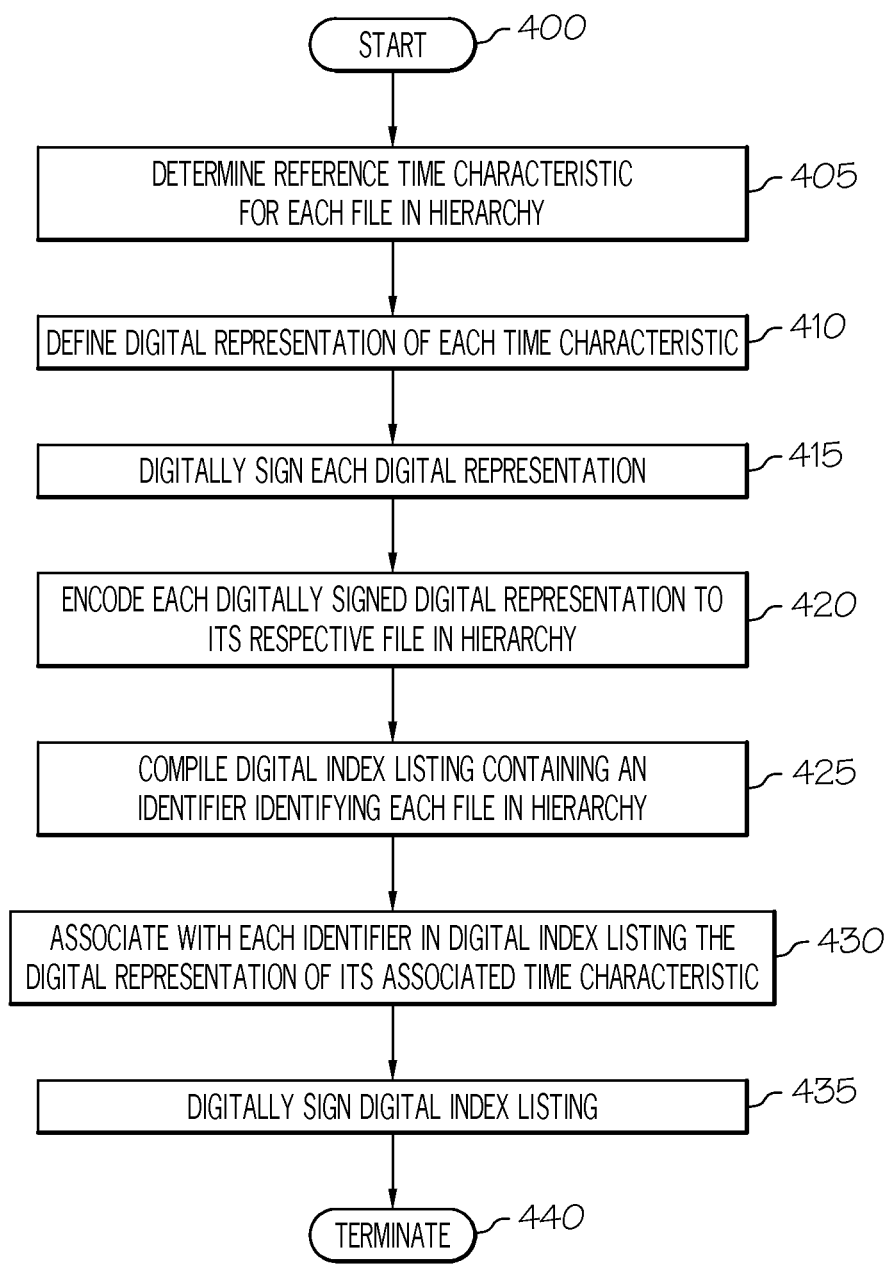
FIG. 4 shows the steps of a method of tamper proofing a plurality of files in a hierarchical file structure according to an embodiment of the present invention.

FIG. 4 shows the steps of a method of tamper proofing a plurality of files in a hierarchical file structure according to an embodiment of the present invention. Referring to FIG. 4, the method starts at step 400 before proceeding to step 405 at which a reference time is determined for each file, representing a time at which said file is presumed not to have been tampered with. The method then proceeds to step 410 at which a digital representation of each time characteristic is determined, and then to step 415 at which each digital representation is digitally signed. The method then proceeds to step 420 at which each digitally signed digital representation is encoded into its respective file. The method then proceeds to step 425 at which a digital index listing is compiled, containing an identifier identifying each file, and associating with each identifier in step 430, the digital representation of its respective associated time characteristic. The method finally digitally signs the digital index listing in step 435 before terminating at step 440.

It will be appreciated that the order of these steps may be modified without affecting the underlying principle. For example, the steps of digitally signing the data files and the index may be carried out any time after the compilation of the required modification data. Similarly, the preparation of the data files may be carried out after or in parallel with the preparation of the index files.

While, as described above time, characteristics are determined for all files together, it will be appreciated that a repository could be migrated to a secured repository in accordance with the present invention in a piecewise fashion whereby each data file is incorporated into the repository when relevant time characteristic information becomes available.

The repository itself may be defined by the digital index listing. In other words, a file may be considered to belong to the repository if it has an entry in the digital index listing. Alternatively, the repository may be defined my other means, for example, as including all files with a particular filename element or file extension, or being situated in a particular directory subtree.

The updating or checking of information stored in the "index last update date" field or the "file last update date" field 2612, 2614 (FIG. 3) may be triggered by operations such as:

1. Add a new file in the repository
2. Update an existing file in the repository
3. Remove an existing file in the repository
4. Read an existing file in the repository Where such an event is detected, there may follow a process for maintaining the hierarchical file structure as described below.

Figure 5:
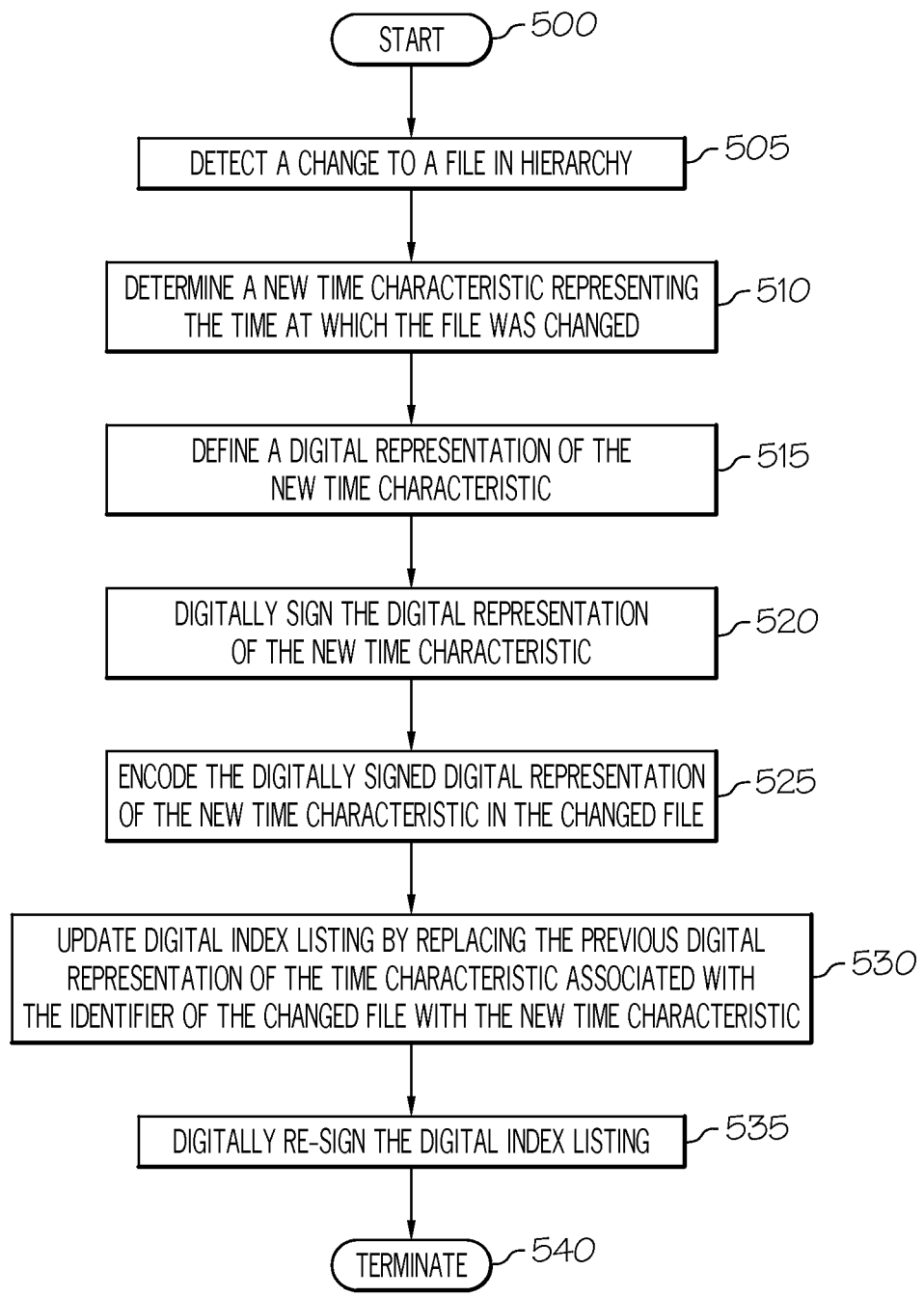
FIG. 5 shows the steps of a method of maintaining a hierarchical file structure according to a further embodiment of the present invention.

FIG. 5 shows the steps of a method of maintaining a hierarchical file structure according to a further embodiment of the present invention. Referring to FIG. 5, the method starts at step 500, before proceeding to step 505 at which an authorized change to one of said files as described above is detected. Upon detecting such a change, the method proceeds to step 510 at which a new time characteristic is determined for the change. The method then proceeds to step 515 at which a digital representation of said new time characteristic is determined, which is then digitally signed at step 520. As described above, the digital signature may also be derived by taking into account other elements from the file, such as its data payload. The method next proceeds to step 525 at which the digitally signed digital representation of said new time characteristic is encoded into the changed file. Then the digital index listing is next updated by replacing the previous digital representation of the time characteristic associated with the identifier of said changed file with said new time characteristic at step 530, and finally the digital index listing is digitally re-signed at step 535. The method terminates at step 540.

It will be appreciated that the order of these steps may be modified without affecting the underlying principle. For example, the steps of digitally signing the data files and the index may be carried out any time after the compilation of the required modification data. Similarly, the preparation of the data files may be carried out after or in parallel with the preparation of the index files.

An "authorized change" is any change which is implemented via a process which is capable of implementing the maintenance steps as described herewith. For example, it may be a change automatically carried out by a particular piece of software which is provided with the means necessary to carry out the steps of FIG. 5 at the same time. It may also be directly caused by the instructions of a human user via the interface of such a piece of software. The software may be a component of the operating system. In any case, where a modification is carried out at the behest of a human user, the concept of authorization will generally imply that the user has justified an appropriate level of access rights, for example on the basis of a log-on process.

By establishing and maintaining a repository as described above, it becomes possible to detect any unauthorized changes to the contents of the repository. Preferably, the repository will periodically be checked for consistency as described hereafter.

By performing a consistency check on the ".index last update date" and "file last update date," it will be possible to detect errors like:

1. Single file corruption
   A. mismatch on file dates;
   B. corrupted file
2. Entire repository area corruption
   A. missing or corrupted .index
   B. mismatch on .index dates Once such unauthorized modifications are detected, remediation steps, such as the following, may be carried out.

1. Delete the file from the repository
2. Fix the inconsistency
3. Revert to an archived version of the repository
4. Put the file in quarantine
5. Alert a user or system manager of the inconsistency Additional scenarios are related to the recovery actions of a corrupted file due to a malicious user or to an unexpected behavior, like for example, an application dump.

Figure 6:
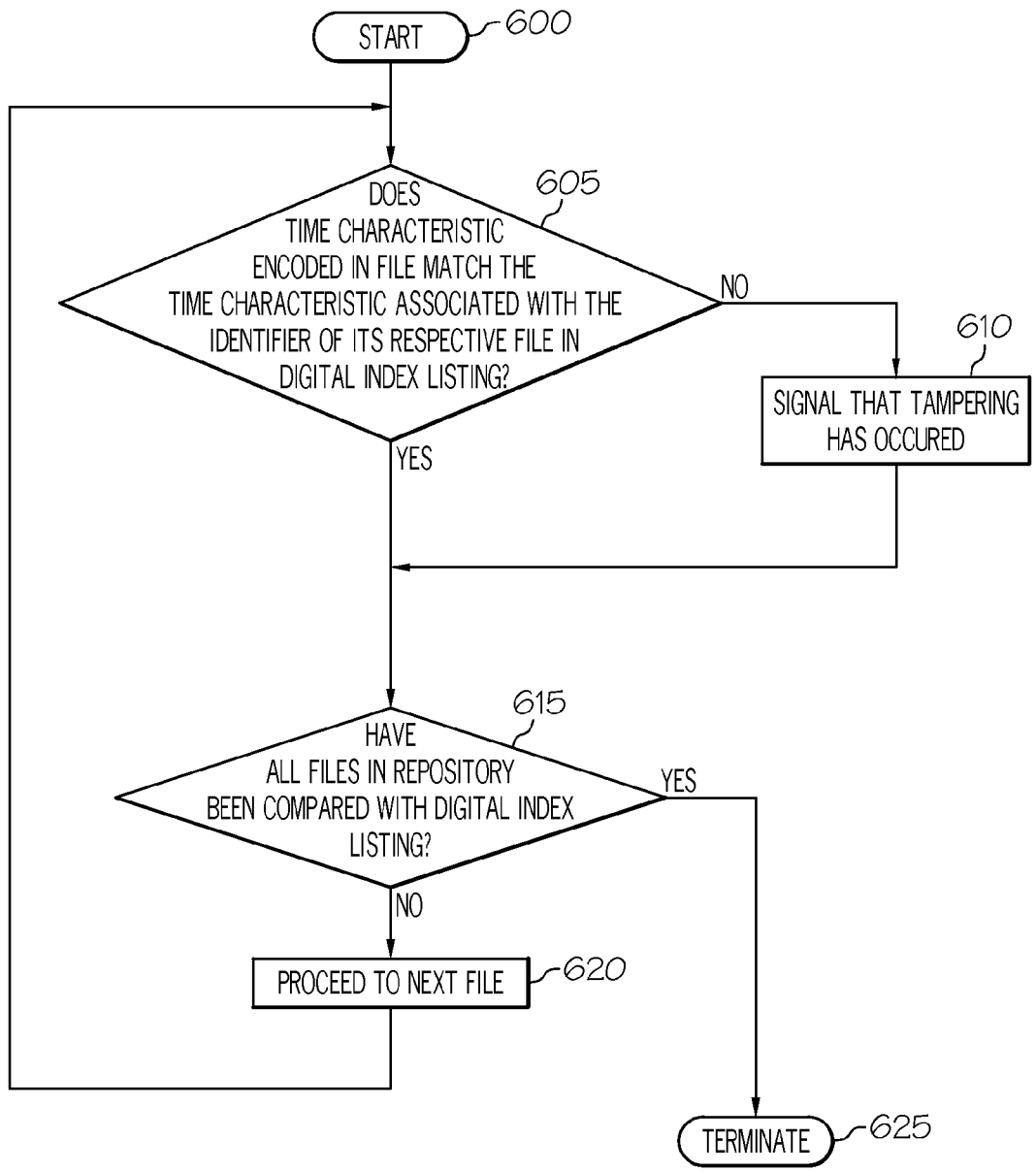
FIG. 6 shows the steps of a method of detecting tampering in a repository created as described above in accordance with an embodiment of the present invention.

FIG. 6 shows the steps of a method of detecting tampering in a repository created as described above. Referring to FIG. 6, the method starts at step 600 before proceeding to step 605 at which it is determined for a first file whether the time characteristic encoded in that file matches the characteristic associated with the identifier of each respective said file in said digital index listing. If the two are found not to match, the method proceeds to step 610, at which a signal indicating that tampering has occurred is emitted. This check may advantageously be accompanied by a check to determine that the digital signature of the file is valid, although this may be carried out at any other time as desired. It will be appreciated that this signal may be an internal signal, which may in turn trigger any remediation or warning measure, such as those outlined above. It will be understood that any discrepancy between the contents of the digital index listing and the files of the repository will be considered a mismatch, including any reference in the digital index listing with no corresponding file in the repository, and in cases where the extent of the repository is defined in a manner other than the digital index listing itself, where there is a file in the repository and no corresponding entry in the digital index listing. If the two are found to match, or after the signal is emitted, the method proceeds to step 615, at which it is determined whether all files in the repository have been compared with their respective entry in the digital index listing. Where not all files have been compared, the method selects the next file in the repository at step 620 before looping back to step 605. Where all files have been compared, the method terminates at step 625, until the next check is due.

The method is clearly dependent on the presence of the digital index listing. A missing digital index listing may be handled in a similar manner to a failed consistency check at step 605.

It is also desirable to check that the digital signature of the digital index listing is valid. An invalid signature may be handled in a similar manner to a failed consistency check at step 605.

Although described as a file, the index can be any computer readable list, which need not be a conventional file.

Although embodiments of the invention have been described in terms of hierarchical data structures, the repository itself needs no display such as a hierarchical structure.

According to a further embodiment, rather than using a specific database, an application may use an existing hierarchical file structure such as provided by conventional operating systems to store structured data in a number of files. To detect unauthorized, malicious or inadvertent changes to these files, either within one or more files, or by deletion, replacement or movement of files in their entirety, each file incorporates a last change timestamp and the contents of the file are digitally signed. Furthermore, every file in the secure repository is logged in an index file together with its respective change date stamp, and the index file as a whole is also digitally signed. Unauthorized changes can be identified by comparison of the file date stamps with the content of the index, as well as verifying the validity of each digital signature.

As described above, the repository is preferably built using a subtree of the existing hierarchical file structure as provided by the operating system. Depending on the implementation details of the file structure, it may be possible to re-use certain features of the existing file structure in implementing embodiments of the present invention. For example, a table, such as the directly table of the FAT file system, may either be extended or partially cloned to reproduce the index. Certain file systems may also provide features helpful in the digital signing of the table and/or data files. File systems often provide for date stamping of changes, which again may be leveraged so as to reduce the footprint of the repository in terms of resource requirements. An operating system may incorporate an embodiment of the invention.

Figure 7:
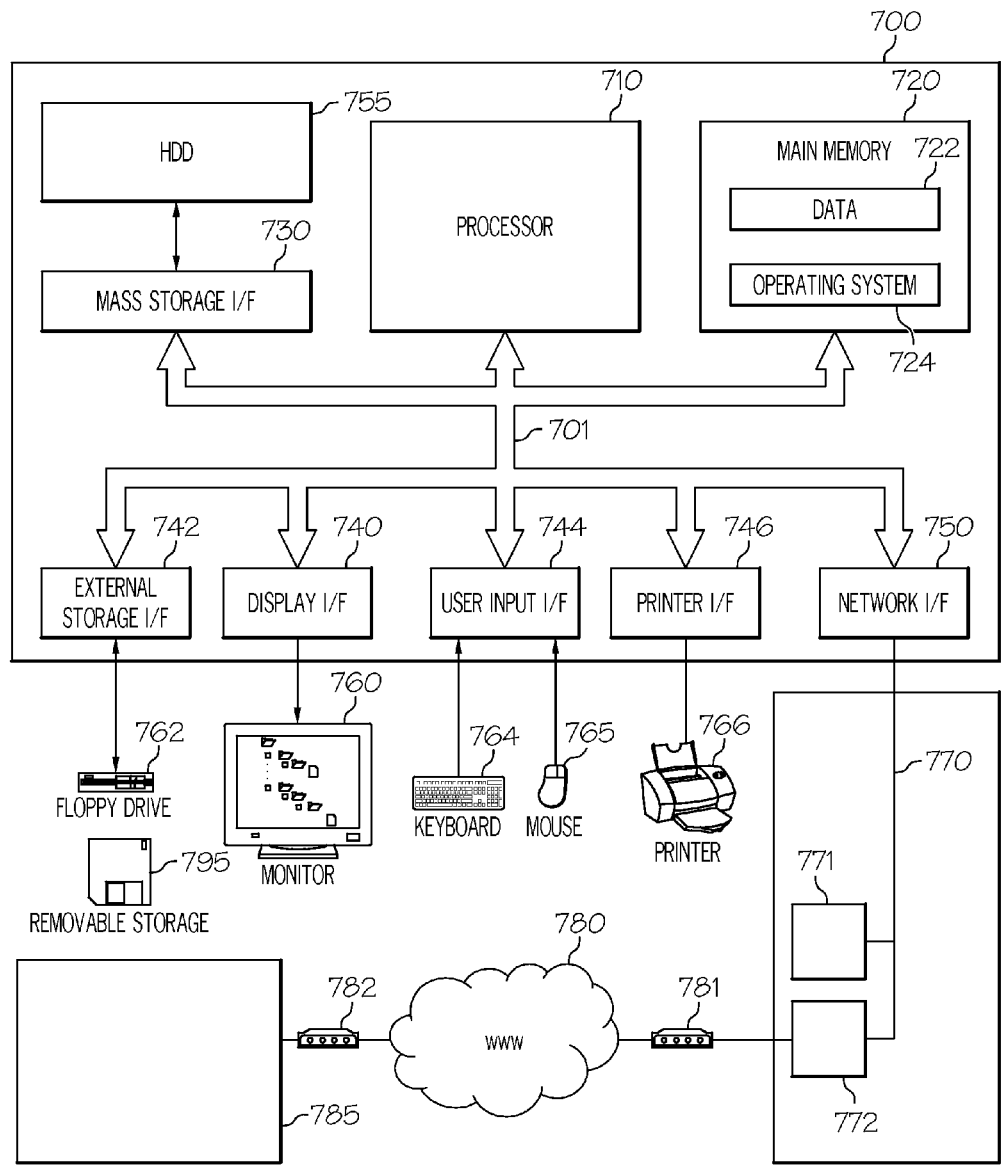
FIG. 7 shows a hardware environment suitable for implementing certain embodiments.

FIG. 7 shows a hardware environment suitable for implementing certain embodiments. Computer system 700 comprises a processor 710, a main memory 720, a mass storage interface 730, a display interface 740, an external storage interface 742 and a network interface 750. These system components are interconnected through the use of a system bus 701. Mass storage interface 730 is used to connect mass storage devices (hard disk drive (HDD) 755) to computer system 700. External storage interface 742 is used to connect a removable storage interface drive 762, such as a floppy disk drive which may store data to and read data from a floppy disk 795, but many other types of computer readable storage medium may be envisaged, such as readable and optionally writable CD ROM drive. There is similarly provided a user input interface 744 which received user interactions from interface devices, such as a mouse 765 and a keyboard 764. There is still further provided a printer interface 746 which may send and optionally receive signals to and from a printer 766.

Main memory 720 in accordance with the preferred embodiments contains data 722, an operating system 724.

Computer system 700 utilizes well known virtual addressing mechanisms that allow the programs of computer system 700 to behave as if they only have access to a large, single storage entity instead of access to multiple, smaller storage entities such as main memory 700 and HDD 755. Therefore, while data 722, operating system 724, are shown to reside in main memory 720, those skilled in the art will recognize that these items are not necessarily all completely contained in main memory 720 at the same time. It should also be noted that the term "memory" is used herein to generically refer to the entire virtual memory of computer system 700.

Data 722 represents any data that serves as input to or output from any program in computer system 700. Operating system 724 is a multitasking operating system known in the industry as OS/400; however, those skilled in the art will appreciate that the spirit and scope of the present invention is not limited to any one operating system.

Processor 710 may be constructed from one or more microprocessors and/or integrated circuits. Processor 710 executes program instructions stored in main memory 720. Main memory 720 stores programs and data that processor 710 may access. When computer system 700 starts up, processor 710 initially executes the program instructions that make up operating system 724. Operating system 724 is a sophisticated program that manages the resources of computer system 700. Some of these resources are processor 710, main memory 720, mass storage interface 730, display interface 740, network interface 750, and system bus 701.

Although computer system 700 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 710. However, those skilled in the art will appreciate that the present invention applies equally to computer systems that simply use I/O adapters to perform similar functions.

Display interface 740 is used to directly connect one or more displays 760 to computer system 700. These displays 760, which may be non-intelligent (i.e., dumb) terminals or fully programmable workstations, are used to allow system administrators and users to communicate with computer system 700. Note, however, that while display interface 740 is provided to support communication with one or more displays 760, computer system 700 does not necessarily require a display 765, because all needed interaction with users and other processes may occur via network interface 750.

Network interface 750 is used to connect other computer systems and/or workstations to computer system 700 across a network 770. The present invention applies equally no matter how computer system 700 may be connected to other computer systems and/or workstations, regardless of whether the network connection 770 is made using present-day analogue and/or digital techniques or via some networking mechanism of the future. In addition, many different network protocols can be used to implement a network. These protocols are specialised computer programs that allow computers to communicate across network 770. TCP/IP (Transmission Control Protocol/Internet Protocol) is an example of a suitable network protocol, for example over an Ethernet network. As shown, the network 770 connects the system 700 to two further devices 771 and 772, which may be other computer systems similar to that described above, or other network capable devices such as printers, routers, etc. In the present example, network device 772 is an lcl server, which is connected via a modem 781 to a public network 780, such as the World Wide Web. By means of this public network 780, a connection to a remote device or system 785 may be established. Remote device 785 may be connected to public network 780 via a modem 782.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for administering a secure data repository, the method comprising:
    determining a time characteristic for each of a plurality of files in a repository, said time characteristic representing a time at which said file is presumed not to have been tampered with;
    defining a digital representation for each of said time characteristics;
    digitally signing each of said digital representations;
    encoding each of said digitally signed digital representations to its respective said file;
    compiling a digital index listing, wherein said digital index listing comprises an identifier identifying each of said plurality of files;
    associating each identifier with its respective digital representation of its associated time characteristic;
    digitally signing said digital index listing;
    detecting an authorized change to one of said plurality of files;
    determining a new time characteristic for said authorized change, wherein said new time characteristic represents a time at which said one of said plurality of files was changed;
    defining a digital representation of said new time characteristic;
    digitally signing said digital representation of said new time characteristic;
    encoding said digitally signed digital representation of said new time characteristic to said changed file;
    updating said digital index listing by replacing said digital representation of said time characteristic associated with an identifier of said changed file with said new time characteristic; and
    digitally re-signing said digital index listing.

2. The method as recited in claim 1 further comprising:
    comparing said time characteristic encoded in each of said plurality of files with said time characteristic associated with said identifier of each respective file in said digital index listing; and
    signalling that tampering has occurred when a time characteristic encoded in a file of said plurality of files does not match its respective time characteristic associated with said identifier of its respective file in said digital index listing.

3. The method as recited in claim 2 further comprising:
    signalling that tampering has occurred in response to said digital index listing being missing.

4. The method as recited in claim 2 further comprising:
    signalling that tampering has occurred in response to said digital signature of said digital index listing not corresponding to the contents of said digital index listing.

5. The method as recited in claim 2 further comprising:
    signalling that tampering has occurred in response to said digital signature of any one of said plurality of files not corresponding to the contents of that respective file.

6. A computer program product embodied in a computer readable storage device for administering a secure data repository, the computer program product comprising the programming instructions for:

determining a time characteristic for each of a plurality of files in a repository, said time characteristic representing a time at which said file is presumed not to have been tampered with;

defining a digital representation for each of said time characteristics;

digitally signing each of said digital representations;

encoding each of said digitally signed digital representations to its respective said file;

compiling a digital index listing, wherein said digital index listing comprises an identifier identifying each of said plurality of files;

associating each identifier with its respective digital representation of its associated time characteristic;

digitally signing said digital index listing;

detecting an authorized change to one of said plurality of files;

determining a new time characteristic for said authorized change, wherein said new time characteristic represents a time at which said one of said plurality of files was changed;

defining a digital representation of said new time characteristic;

digitally signing said digital representation of said new time characteristic;

encoding said digitally signed digital representation of said new time characteristic to said changed file;

updating said digital index listing by replacing said digital representation of said time characteristic associated with an identifier of said changed file with said new time characteristic; and digitally re-signing said digital index listing.

7. The computer program product as recited in claim 6 further comprising the programming instructions for:

comparing said time characteristic encoded in each of said plurality of files with said time characteristic associated with said identifier of each respective file in said digital index listing; and signalling that tampering has occurred when a time characteristic encoded in a file of said plurality of files does not match its respective time characteristic associated with said identifier of its respective file in said digital index listing.

8. The computer program product as recited in claim 7 further comprising the programming instructions for:

signalling that tampering has occurred in response to said digital index listing being missing.

9. The computer program product as recited in claim 7 further comprising the programming instructions for:

signalling that tampering has occurred in response to said digital signature of said digital index listing not corresponding to the contents of said digital index listing.

10. The computer program product as recited in claim 7 further comprising the programming instructions for:

signalling that tampering has occurred in response to said digital signature of any one of said plurality of files not corresponding to the contents of that respective file.

11. A system, comprising:

a memory unit for storing a computer program for administering a secure data repository; and a processor coupled to said memory unit, wherein said processor, responsive to said computer program, comprises:

circuitry for determining a time characteristic for each of a plurality of files in a repository, said time characteristic representing a time at which said file is presumed not to have been tampered with;

circuitry for defining a digital representation for each of said time characteristics;

circuitry for digitally signing each of said digital representations;

circuitry for encoding each of said digitally signed digital representations to its respective said file;

circuitry for compiling a digital index listing, wherein said digital index listing comprises an identifier identifying each of said plurality of files;

circuitry for associating each identifier with its respective digital representation of its associated time characteristic;

circuitry for digitally signing said digital index listing;

circuitry for detecting an authorized change to one of said plurality of files;

circuitry for determining a new time characteristic for said authorized change, wherein said new time characteristic represents a time at which said one of said plurality of files was changed;

circuitry for defining a digital representation of said new time characteristic;

circuitry for digitally signing said digital representation of said new time characteristic;

circuitry for encoding said digitally signed digital representation of said new time characteristic to said changed file;

circuitry for updating said digital index listing by replacing said digital representation of said time characteristic associated with an identifier of said changed file with said new time characteristic; and circuitry for digitally re-signing said digital index listing.

12. The system as recited in claim 11, wherein said processor further comprises:

circuitry for comparing said time characteristic encoded in each of said plurality of files with said time characteristic associated with said identifier of each respective file in said digital index listing; and circuitry for signalling that tampering has occurred when a time characteristic encoded in a file of said plurality of files does not match its respective time characteristic associated with said identifier of its respective file in said digital index listing.

13. The system as recited in claim 12, wherein said processor further comprises:

circuitry for signalling that tampering has occurred in response to said digital index listing being missing.

14. The system as recited in claim 12, wherein said processor further comprises:

circuitry for signalling that tampering has occurred in response to said digital signature of said digital index listing not corresponding to the contents of said digital index listing.

15. The system as recited in claim 12, wherein said processor further comprises:

circuitry for signalling that tampering has occurred in response to said digital signature of any one of said plurality of files not corresponding to the contents of that respective file.

* * * * *